US008794969B2

(12) United States Patent
Tenning et al.

(10) Patent No.: US 8,794,969 B2
(45) Date of Patent: Aug. 5, 2014

(54) AIRCRAFT PNEUMATICS TRAINING AID AND METHODS

(75) Inventors: Philip M. Tenning, Seattle, WA (US); Greg Cass, Seattle, WA (US)

(73) Assignee: Alaska Airlines, Inc., Seattle, WA (US)

( * ) Notice: Subject to any disclaimer, the term of this patent is extended or adjusted under 35 U.S.C. 154(b) by 97 days.

(21) Appl. No.: 13/223,181

(22) Filed: Aug. 31, 2011

(65) Prior Publication Data

US 2012/0315602 A1   Dec. 13, 2012

Related U.S. Application Data

(60) Provisional application No. 61/495,325, filed on Jun. 9, 2011.

(51) Int. Cl.
*G09B 9/08* (2006.01)
*G09B 9/00* (2006.01)

(52) U.S. Cl.
USPC .............................................. 434/29; 434/30

(58) Field of Classification Search
USPC ....................................................... 434/29, 30
See application file for complete search history.

(56) References Cited

U.S. PATENT DOCUMENTS

| 2,487,758 | A | * | 11/1949 | Kail | 434/54 |
| 3,363,340 | A | * | 1/1968 | McKinley | 434/126 |
| 4,977,529 | A | * | 12/1990 | Gregg et al. | 703/18 |
| 6,401,058 | B1 | * | 6/2002 | Akalin et al. | 703/7 |
| 6,638,071 | B2 | * | 10/2003 | Stockman | 434/35 |
| 6,893,262 | B2 | * | 5/2005 | Stockman | 434/29 |

OTHER PUBLICATIONS

"737-600/700/800/900 Aircraft Maintenance Manual, Chapter 36, Pneumatic". The Boeing Company. Jun. 10, 2002.*
"Pneumatics". Jan. 26, 2009. Retrieved from the internet on Jan. 14, 2013 from <URL: http://wayback.archive.org/web/20090126100709/http://aerowinx.com/html/pneumatics.html>.*
"Learning Systems: Fluid Power: Pneumatics" Festo. Feb. 2005. Retreived Oct. 22, 2013 from <url: http://www.festo.com/net/SupportPortal/Files/10131/PneumaticTrainingBrochure.pdf>.*
"Bleed air," http;/Wikipedia.org/wiki/bleed_air, (downloaded Apr. 22, 2011).
"Boeing 757 Air Systems: Pneumatics," http://vvww.biggles-software.com/software/757_tech/air_systems/pneumatics.htm, 3 pages (downloaded Apr. 22, 2011).
The Boeing Company, "737-600/700/800/900 Aircraft Maintenance Manual, Chapter 36, Pneumatic," 103 pages (Jun. 10, 2002).
The Boeing Company, "737 Flight Crew Operations Manual, Chapter 2, Air Systems," 22 pages (Sep. 28, 2006).
"Pneumatics," http://aerowinx.com/html/pneumatics.html, 7 pages (downloaded Jul. 1, 2011).

(Continued)

*Primary Examiner* — Sam Yao
*Assistant Examiner* — Peter J Alley
(74) *Attorney, Agent, or Firm* — Klarquist Sparkman, LLP

(57) ABSTRACT

A vehicle pneumatic system training aid comprises simulated controls and indicators and a pneumatic circuit. The simulated controls and indicators correspond to at least a portion of controls and indicators on an actual vehicle. The pneumatic circuit comprises a connection to a source of pressurized fluid, and at least one fluid flow control device. The fluid flow control device is positionable in at least two different positions corresponding to different actual vehicle conditions that are simulatable. The simulated controls are actuatable to change a condition of the pneumatic circuit and the simulated indicators are operable to display an indication of the condition of the pneumatic circuit.

5 Claims, 13 Drawing Sheets

(56) References Cited

OTHER PUBLICATIONS

The 737 Technical Site, "Pneumatics," http://b737.org.uk/pneumatics.htm, 4 pages (downloaded Feb. 21, 2011).

Southeast Flight Support, "Boeing 737, Bleed Air System Schematic," 29 pages (no date).

* cited by examiner

AIRCRAFT PNEUMATICS TRAINING AID AND METHODS

CROSS REFERENCE TO RELATED APPLICATIONS

This application claims the benefit of U.S. Provisional Patent Application No. 61/495,325, filed Jun. 9, 2011, which is hereby incorporated by reference.

FIELD

This application relates to training aids, and more specifically to a training aid for teaching aspects of a complex system on a vehicle, such as aspects of a pneumatic system used on aircraft.

BACKGROUND

Engine bleed air is the term used to refer to a portion of the air that has passed through all or part of an engine and is bled off for other purposes, such as to power a pneumatic system. Typically, engine bleed air is compressed air from a jet engine, such as a jet engine for an aircraft. Engine bleed air from a jet engine has a high temperature and a high pressure, so it is a potent source of energy, as well as being reliably available.

An aircraft pneumatic system uses engine bleed air as its primary source of power and serves several functions, including supplying power to (1) engine start systems (i.e., the bleed air from one running engine can be used to start another engine), (2) cabin air conditioning and pressurization systems, (3) anti-ice systems for the leading edges of the wings and the engine inlet cowls, (4) a pressurized water supply (which includes, e.g., lavatory water), (5) a pressurized hydraulic system and (6) an inert gas system, in one well known application. In a typical passenger jet aircraft, each engine has an engine air bleed system. Thus, for a Boeing 737, there is a first engine bleed air system for the left engine and a second engine bleed air system for the right engine. Under certain conditions, including when engine bleed air is not available, the pneumatic system is powered or pressurized by supplying air from a pneumatic ground air connection (i.e., while the aircraft is stationary on the ground) or the aircraft's on-board auxiliary power unit (APU). The multiple sources of power for the pneumatic system, including the left engine, the right engine, the APU and the pneumatic ground air connection, can be joined together at a manifold.

In an engine bleed air system, there is typically a valve or valves, such as a Pressure Regulating and Shutoff valve (PRSOV) in the 737 system, actuatable to move from a closed position (no engine bleed air) to an open position (full engine bleed air) to provide a flow of engine bleed air. For a 737, each valve is controlled by a bleed air switch on the pilot's instrument panel. Moving the switch to the ON position opens the valve, and when pressures are sufficient, a flow of engine air from the engine begins. Moving the switch to the OFF position closes the engine air bleed valve and blocks the flow of engine bleed air.

While engine bleed air is flowing (i.e., the PRSOV is open), the system is monitored for engine bleed air trip events that would cause undesired conditions in the engine bleed air system, such as if the temperature and/or pressure of the engine bleed air increase beyond predetermined limits. In response to sensing high temperature or high pressure of the bleed air, the valve is tripped to its closed position. A light on the pilot's instrument panel, "Bleed Trip Off," which indicates that the valve has been tripped closed and the engine bleed air flow is off, is then illuminated.

Following an engine bleed air trip event, the valve remains closed until the engine bleed air system is reset. The pilot may wait for a short time to allow the high temperature and/or high pressure condition to dissipate, and then use a "Reset" function on the instrument panel to attempt to reset the system. If the reset is accepted, then the PRSOV is opened and the Bleed Trip Off lamp is extinguished. The PRSOV is of a butterfly valve design that is spring-loaded to a closed position and pneumatically operable to move towards a fully open position.

Within the 737 jet engine, the source of engine bleed air is the fifth and ninth stages of the high pressure compressor. There is a high stage regulator and a high stage control valve that control the flow of ninth stage bleed air. For the fifth stage, there is a fifth stage check valve that prevents flow of bleed air in the reverse direction back into the fifth stage. Engine bleed air passes through a precooler (an air to air heat exchanger), which allows the temperature of the engine bleed air to be lowered as necessary. At low engine speeds, it is the ninth stage engine bleed air that is supplied to the pneumatic system because the fifth stage flow is not sufficient, and the fifth stage check valve prevents reverse flow. At high engine speeds, the high stage valve closes and it is engine bleed air from the fifth stage that is supplied to the pneumatic system.

The manifold has a bleed air isolation valve operable to separate the manifold into left and right sides. The manifold also has a number of instruments, such as sensors, to determine the pressures and temperatures of various flows. The three positions of the bleed air isolation valve are as follows: (1) open: the right and left sides of the manifold are connected (i.e., engine bleed air from the right and left engines is combined); (2) auto: the aircraft switch position logic controls the valve to open and close as necessary for aircraft operations; and (3) closed: the valve is closed when it is desirable to separate the right and left sides of the manifold (i.e., separating the right engine and left engine flows from each other).

Bleed air trip off events occur most frequently because of a problem with the precooler, but other possible causes can arise too. Bleed air trip off events can occur during takeoff, top of ascent, cruise, top of descent, or other phase of flight when the pressure and/or temperature of the bleed air exceeds predetermined limits.

The engine air bleed system is complex and multi-faceted, so it is difficult to teach its features and their interaction with other systems of the aircraft. This difficulty is increased because the controls and indicators for the engine air bleed system are necessarily located in the cockpit for access by the pilot, but are out of view of aircraft service personnel seeking to learn their interaction with other components so troubleshooting and repair can be carried out more quickly and accurately. In addition, because the engine bleed air system only provides bleed air when the jet engine is running, it is at least difficult if not impossible to demonstrate full operation because of the close proximity of some of the components to the running jet engine.

SUMMARY

Described below are examples of a training aid that addresses problems in the prior art.

According to one example, a vehicle pneumatic system training aid comprises simulated controls and indicators and a pneumatic circuit. The simulated controls and indicators correspond to at least a portion of controls and indicators on an actual vehicle. The pneumatic circuit comprises a connection to a source of pressurized fluid, and at least one fluid flow control device. The fluid flow control device is positionable in at least two different positions corresponding to different actual vehicle conditions that are simulatable. The simulated controls are actuatable to change a condition of the pneumatic circuit, and the simulated indicators are operable to display an indication of the condition of the pneumatic circuit.

The simulated controls can be actuatable to cause the at least one fluid flow control device to change position. At least one of the indicators can change condition depending upon the position of the fluid control device. The fluid control device can be a valve or valves. The fluid control device can change position based on temperature.

The pneumatic circuit can comprise a simulated ninth stage regulator connected to a high stage regulator, a high stage valve, a bleed air regulator, a pressure regulating and shutoff valve, a simulated precooler and a precooler control valve, the pneumatic circuit further comprising a fifth stage regulator connected to a fifth stage check valve, the high stage valve, the pressure regulating and shutoff valve, the bleed air regulator, the precooler control valve and the precooler.

The vehicle can be an aircraft, and one of the different actual vehicle conditions that is simulatable can comprise an engine bleed air trip event.

The training aid may further comprise a source of heat operable to raise a temperature of a fluid stream in the pneumatic circuit. The fluid control device in the pneumatic circuit may be configured to change positions based on a predetermined temperature of the fluid stream.

The training aid may comprise an over temp switch operable to cause a fluid control device to change position and to cause one of the indicators to change condition when a sensed temperature of the pressurized fluid in the pneumatic circuit reaches a predetermined threshold. The pneumatic circuit may provide a simulated engine bleed air flow, and the over temp switch may be operable to close at least one fluid control device and stop the simulated engine bleed air flow. The over temp switch may be triggered when the sensed temperature of the simulated engine bleed air flow reaches 490° F., and one of the indicators may change condition to indicate that a bleed trip event has occurred.

The simulated controls and indicators may correspond to at least a portion of the actual controls and indicators located in the cockpit of the aircraft, and the simulated controls and indicators in the training aid may be positioned within view of the fluid flow control device.

The training aid may comprise a connection to a source of electrical power. The connection to the source of electrical power may comprise a connection to a conventional 115 volt AC source.

The connection to a source of pressurized fluid may comprise a connection to a shop compressed air pressure supply or to a container of a compressed gas. The connection to a source of pressurized fluid may comprise a connection to a source of pressure of about 80 psi to about 150 psi.

The training aid may comprise a simulated overpressure switch configured to simulate an actual overpressure switch in the actual vehicle, the simulated overpressure switch causing the indicators to indicate that an engine bleed air trip event occurred if the simulated overpressure switch is triggered, wherein the simulated overpressure switch is triggerable at a lower overpressure than the actual overpressure switch.

The training aid may be configured to be portable. The pneumatic circuit may comprise at least one component actuatable by an instructor to change to a different simulated actual vehicle condition in real time.

A method of simulating operation of a vehicle pneumatic system comprises providing simulated controls and indicators, providing a simulated pneumatic circuit comprising a connection to a source of pressurized fluid and at least one fluid flow control device and simulating a changed condition in the pneumatic circuit by causing a change in the condition of one of the simulated indicators.

The method may comprise detecting a pressure of a flow in the simulated pneumatic circuit, wherein simulating a changed condition in the pneumatic circuit comprises determining that the pressure of the flow exceeds a predetermined limit. The method may comprise detecting a temperature of a flow in the simulated pneumatic circuit, wherein simulating a changed condition in the pneumatic circuit comprises determining that the temperature of the flow exceeds a predetermined limit.

These and other aspects will become more apparent from the following detailed description, which proceeds with reference to the accompanying figures.

DETAILED DESCRIPTION

Figure 1:
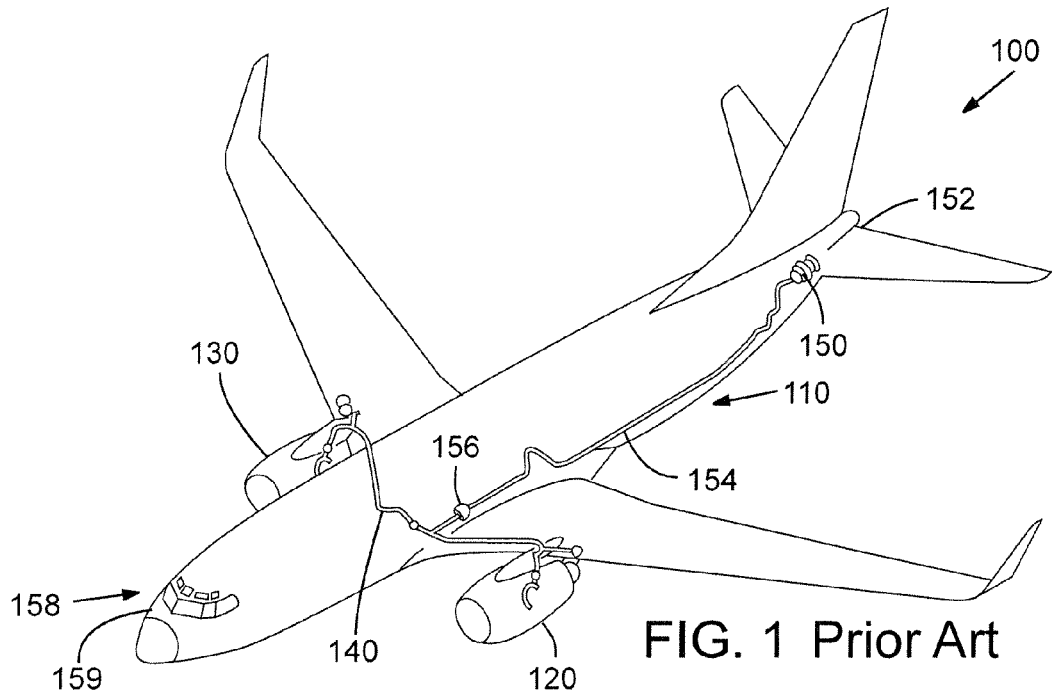
FIG. 1 is a perspective view of a conventional aircraft pneumatic system showing the locations of some principal components.

Referring to FIG. 1, some vehicles, such an aircraft 100, have pneumatic systems for supplying pneumatic power for operating various components. In the aircraft 100, which represents a Boeing 737, a pneumatic system 110 has important components distributed throughout the aircraft. Primary power for the pneumatic system is drawn from a left jet engine 120 (engine 1) and/or a right jet engine 130 (engine 2), and is referred to as bleed air. Air ducts extending from the left and right engines, respectively, are joined together at a pneumatic manifold 140, which is described below in greater detail. An auxiliary power unit (APU) 150 is positioned near a tail 152 of the aircraft. Under certain conditions, the pneumatic system 110 can be powered by the auxiliary power unit 150. The auxiliary power unit 150 is connected to the pneumatic manifold 140 by a line 154 that includes an APU check valve 156. Controls and indicators 158 are positioned for convenience to the vehicle operator, which in the illustrated example is in a cockpit area 159 of the aircraft 100. The controls allow the vehicle operator to adjust or manipulate parameters of the pneumatic system's operations. The indicators allow the vehicle operator to monitor performance of the pneumatic system.

In the case of an aircraft such as a 737, the pneumatic system is used to supply pneumatic power in the form of engine bleed air to engine start systems, cabin air conditioning and pressurization systems, anti-ice systems, pressurized water supply systems, pressurized hydraulic systems and an inert gas system, as some examples.

Figure 2:
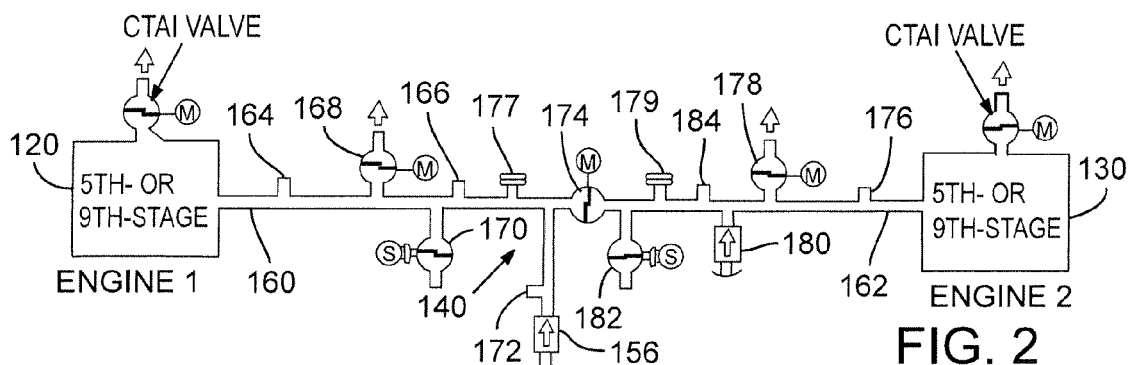
FIG. 2 is a schematic diagram of a manifold in the conventional pneumatic system of FIG. 1 having inputs from the left engine, the right engine, the auxiliary power unit and a ground air connection.

FIG. 2 is a schematic diagram of bleed air inputs from the jet engines to the pneumatic system and various components, including components supplied by the pneumatic system. For the left engine 120, there is a duct 160 that conveys bleed air from the fifth or ninth stages of the left jet engine. An air conditioning pack valve connection is provided at 170. Similarly, for the right engine 130, there is a duct 162 that conveys bleed air from the fifth or ninth stages of the right jet engine. An isolation valve 174 can be actuated to allow the ducts 160 and 162 to be connected, or to keep them isolated from each other. For example, with the left engine 120 in operation in supplying bleed air through the duct 160 and the isolation valve 174 opened, bleed air can be supplied through the engine start connection 176 to start the right engine. Similarly, bleed air could be supplied from the right engine 130 to the engine start connection 164 to start the left engine.

The left engine duct 160 also has a connection 168 to a wing thermal anti-ice (WTAI) system that uses warm bleed air from the engine to keep the leading edge of the wing free from ice. There is also an inert gas system connection 166 on the left engine duct 160. Similarly, the connections along the duct 162 include a respective wing thermal anti-ice system connection 178, a respective air conditioning pack valve connection 182, a water tank connection 172, a pneumatic ground air system connection 180, and a hydraulic reservoir connection 184. Left and right duct pressure transmitters 177, 179 sense the pressures in the left and right ducts, respectively.

Figure 3:
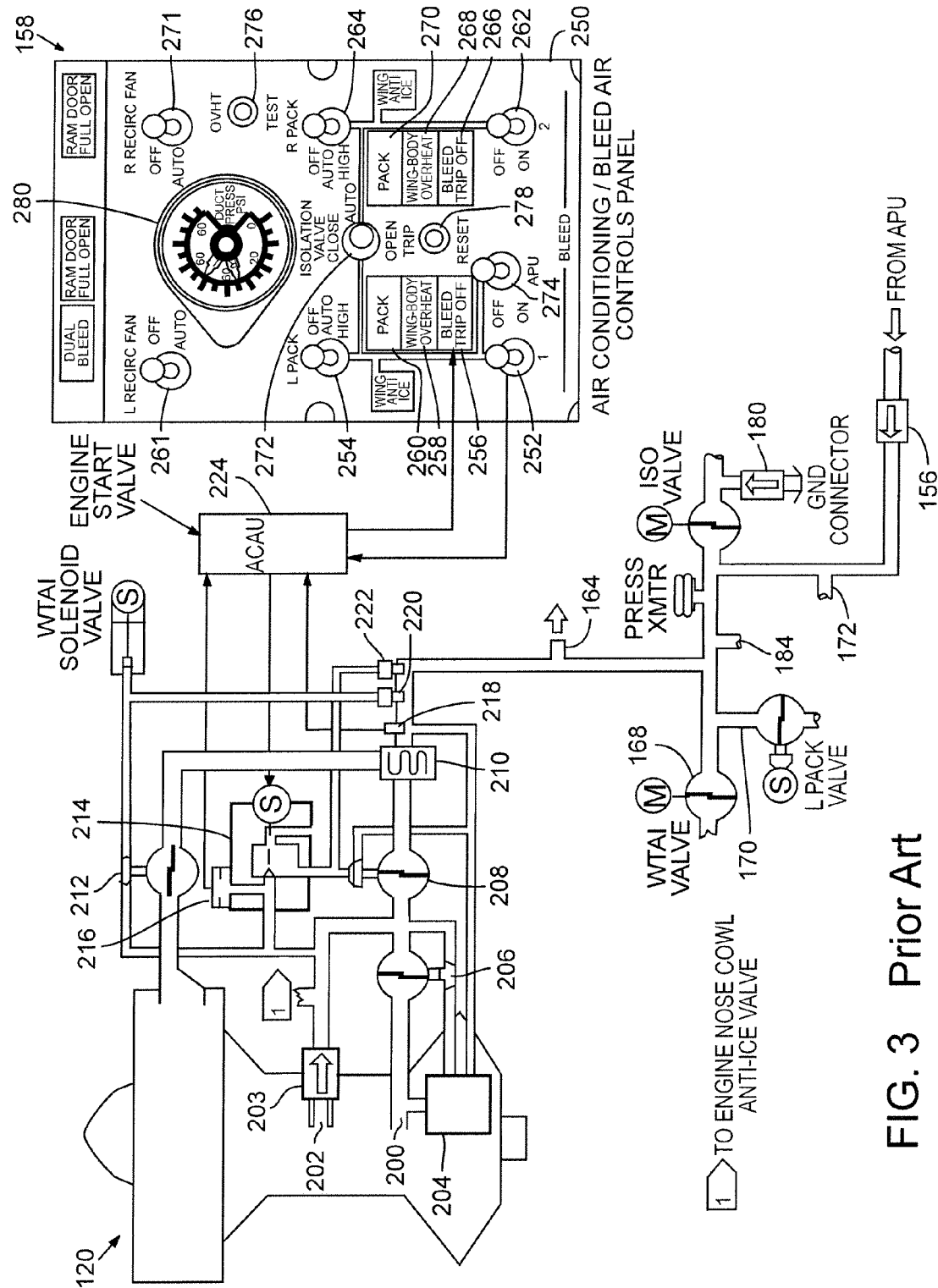
FIG. 3 is a schematic diagram of the left engine of FIG. 1 showing the engine bleed air connections between the left engine and the manifold, together with the cockpit controls and indicators.

FIG. 3 is a schematic diagram of the left engine 120, its engine bleed system components, and the connections to the pneumatic system and the pilot's controls and indicators. For the left engine 120, bleed air is supplied through the ninth stage 200 or the fifth stage 202 (via a check valve 203) of the jet engine. From the ninth stage, bleed air is fed through a high stage regulator 204 that operates a high stage valve 206. In normal operation, the nominal downstream pressure supplied by the high stage valve is about 32 psi. Bleed air from the high stage valve 206 then flows to a pressure regulating and shutoff valve (PRSOV) 208. The PRSOV can be considered the engine air bleed valve, or at least one of the engine air bleed valves, as that term is used herein.

A precooler 210 cools the engine bleed air temperature as necessary by heat transfer between cooler fan air and warmer engine bleed air. The flow of the cooler fan air into the precooler 210 is controlled by the precooler control valve 212. There is a 390° F. precooler control valve sensor 220 that is actuated to initiate precooler operation if the temperature of the bleed air exceeds 390° F. In normal operation, the precooler 210 controls the downstream temperature of the bleed air within the range of 390-440° F. There is a 450° F. thermostat 222 that is actuated if the temperature of the bleed air exceeds 450° F. If the 450° F. thermostat is actuated, then pressure is bled off to operate the PRSOV 208 and move it toward the closed position.

A 490° F. over temp switch 218 is actuated if the temperature of the bleed air exceeds 490° F., triggering a bleed air trip off event. There is an overpressure switch 216 within the bleed air regulator 214 that operates to trigger a bleed air trip off event if the sensed pressure exceeds a predetermined threshold of 220 psi. These conditions are discussed in more detail below. An air conditioning accessory unit (ACAU) 224 receives signal inputs from the switches 216, 218.

At the right side of FIG. 3, the controls and indicators in the cockpit include a control panel 250 for air conditioning and bleed air operations. At the left side of the panel, and corresponding to the operation of the left engine and its bleed and pneumatic systems, are a bleed air switch 252 (shown in the "off" position), a left air conditioning pack switch 254 (shown in the "off" position), a bleed trip off indicator light 256, a wing-body overheat light 258, a pack indicator light 260 and a left recirculation fan switch 261 (shown in the "off" position). For the right engine (not shown in FIG. 3), there is a bleed air switch 262, a right air conditioning pack switch 264, a bleed trip off indicator light 266, a wing-body overheat light 268, a pack light 270 and a right recirculation fan switch 271. There is also an isolation valve control 272, which as illustrated is in the closed position, thus isolating the left bleed air system from the right bleed air system. There is an APU switch 274 (shown in the "off" position) that controls operation of the auxiliary power unit 150. As also illustrated, there is an overheat test switch 276 that can be depressed to test whether an overheat condition exists. A pressure gauge 280 has two independent needles for indicating the pressure in the ducts 160, 162, respectively, from the left and right engines. A larger drawing of a similar panel, except with some of the controls in different positions, is illustrated in FIG. 4B and described below.

If an engine bleed air trip event occurs relative to the left engine, the PRSOV 208 closes immediately to stop the flow of engine bleed air, and the bleed air trip indicator light 256 is illuminated. Typically, some time must elapse to permit the over temperature or over pressure condition to dissipate, if at all. Thereafter, and the reset button 278 is depressed, and if the reset is accepted, the indicator light 256 is extinguished and normal operation resumes (i.e., the PRSOV 208 opens if the bleed air switch 252 is "on").

Figure 4A:
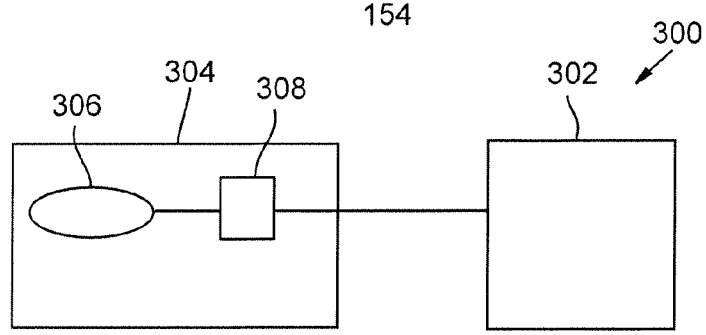
FIG. 4A is a schematic diagram of a vehicle pneumatic system training aid according to a first example.

FIG. 4A is a schematic diagram of a vehicle pneumatic system training aid according to a first example. In the training aid 300, there is a simulated display 302 that has controls and/or indicators corresponding to at least a portion of a vehicle operator's controls and/or indicators for the vehicle's pneumatic system. The simulated display 302 is connected, via electrical, fluid, or data connections, to a pneumatic circuit 304. The pneumatic circuit 304 has a connection to a source of fluid pressure 306 and at least one fluid control device 308 operable to change a flow of engine bleed air. The fluid control device 308 is positionable in at least two different positions corresponding to actual vehicle conditions, and is potentially continuously variable between open and closed positions. The simulated display 302 can be caused to change condition depending upon the state of the system, including, e.g., the position of the fluid control device. The fluid control device 308 can be, e.g., a valve.

Figure 4B:
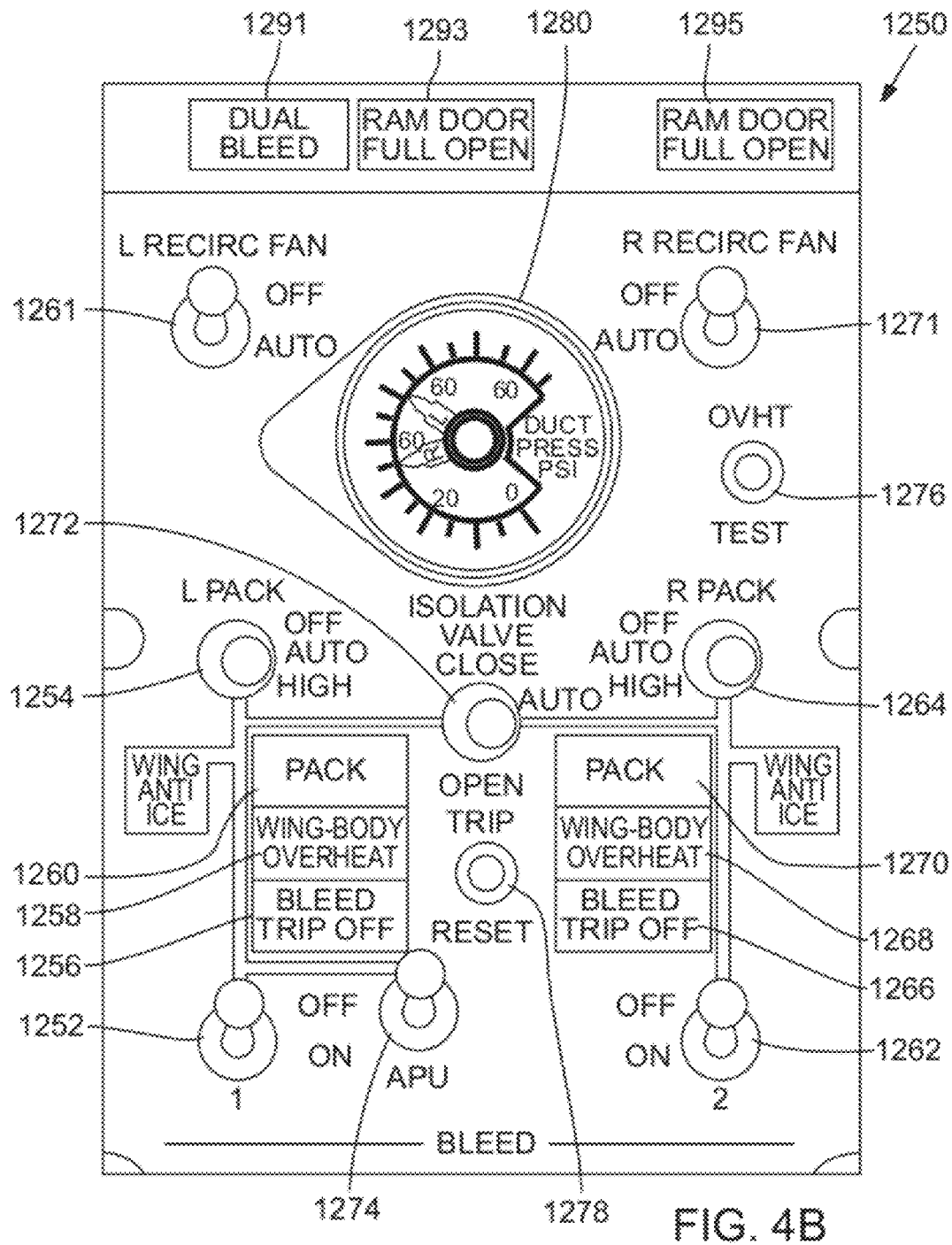
FIG. 4B is a front view of a controls and indicators panel for use with the described training aids.

FIG. 4B shows a panel 1250 for use with the exemplary training aids described in this application. As shown, the panel 1250 closely resembles the actual panel 250, which lends realism to the training aids and makes the controls and indications easier to learn. For convenience, elements in FIG. 4B corresponding with FIG. 3 have a reference numeral equal to the FIG. 3 reference numeral plus 1000. As indicated, some of the controls in FIG. 4B on the panel 1250 are in different positions than on the panel 250: (1) the left and right bleed air switches 1252, 1262 are shown in the "ON" position, (2) the left pack and right pack switches 1254, 1264 are shown in the "AUTO" position, (3) the isolation valve switch 1272 is shown in the "AUTO" position, and (4) the left and right recirculation fans switches are in the "AUTO" position. As shown near the top of the panel 1250, there are indicator lights 1291, 1293 and 1295 to indicate the conditions of "DUAL BLEED," "RAM DOOR FULL OPEN" (left engine) and "RAM DOOR FULL OPEN" (right engine), respectively. The DUAL BLEED indicator light 1291 is lit if at least one engine and the APU are supplying bleed air at the same time.

It should be noted that some of the controls can be physically present in the panel 1250, but they need not be operational. For example, operability of the left pack and right pack switches 1254, 1264 is optional. In another example, only the left controls and indicators are operable.

Figure 5:
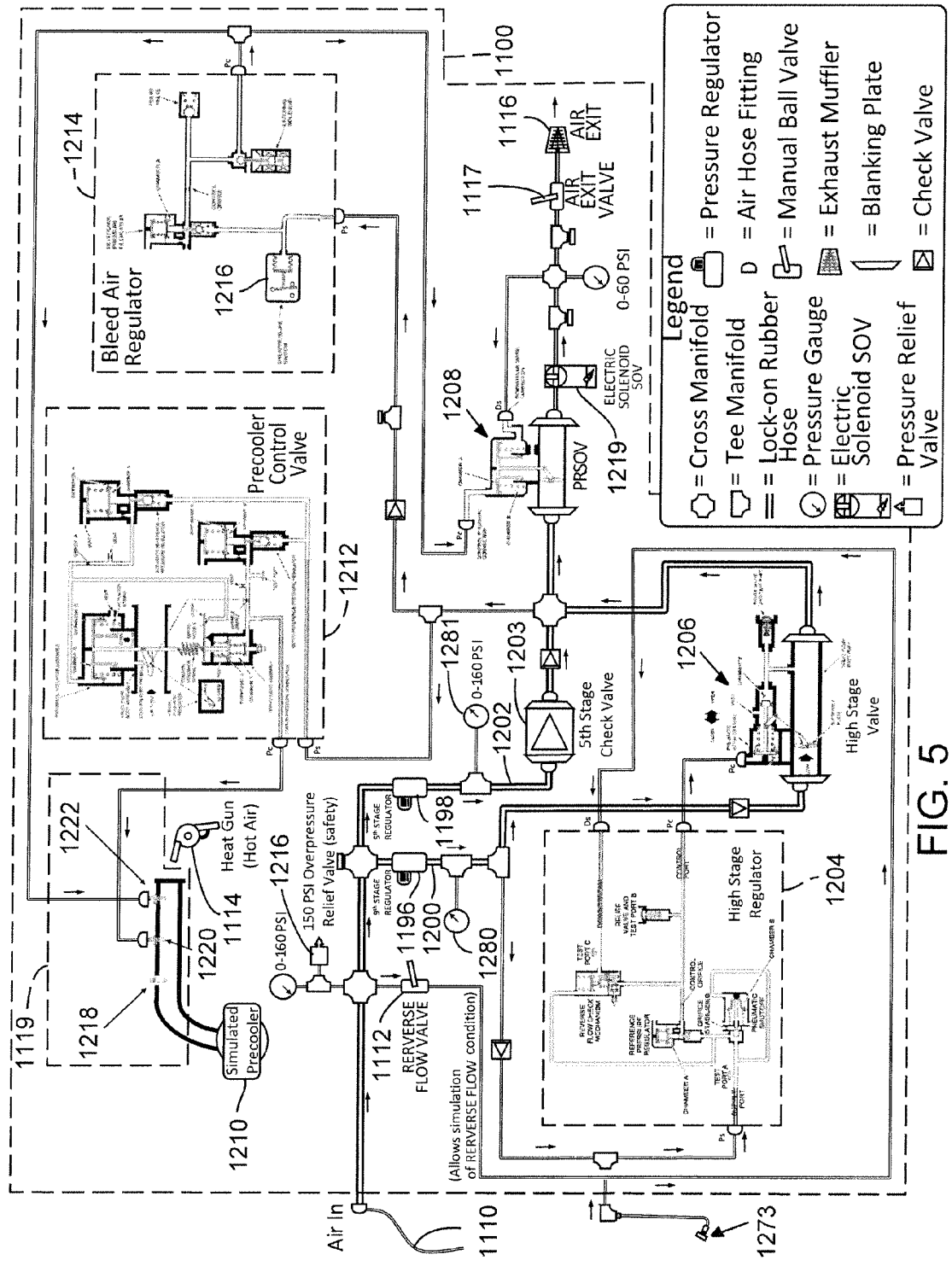
FIG. 5 is a detailed schematic diagram of a vehicle pneumatic system training aid according to a second example.

FIG. 5 is a detailed schematic diagram of a vehicle pneumatic system training aid 1100 according to second example. The training aid 1100 is specifically modeled after the aircraft bleed air and pneumatic system shown in FIGS. 1-3. There is an air source 1110 for supplying pressurized air to the training aid 1100. In the illustrated example, the air source 1110 can be a connection to "shop air" at a pressure of 150 psi or less. It is also possible to use a source of pressurized fluid from a container, e.g., nitrogen from a pressurized bottle.

To make the training aid 1100 more realistic, it can be provided with instances of actual components of the engine bleed system, such as one or more of: a high stage regulator 1204, a high stage valve 1206, a fifth stage check valve 1203, pressure regulating and shutoff valve (PRSOV) 1208, a precooler control valve 1212, a bleed air regulator 1214, a 490° F. over temperature switch 1218, a 390° F. precooler control valve sensor 1220 and a 450° F. thermostat 1222. Some of these components have additional subcomponents as shown in FIG. 5.

Downstream of a pressure regulator 1196, an output 1200 representing the ninth stage of one of the jet engines is directed to the high stage regulator 1204, as well as to the high stage valve 1206. Downstream of a pressure regulator 1198, there is a pressurized air input 1202 representing pressurized air from the fifth stage of the jet engine, which is directed to a fifth stage check valve 1203.

There can be an optional simulated precooler 1210 that serves to control the temperature of the engine bleed air. Since ambient air is used to simulate engine bleed air in the exemplary implementations, and it is usually necessary to heat the ambient air to model the elevated temperatures of interest, modeling the function of the precooler is optional and not required. In the actual vehicle, the precooler control valve 1212 would control the flow of fan air to the precooler to cool the engine bleed air as necessary.

It has been discovered that the simulated bleed air could be kept at close to ambient temperature, which is safe for users and inexpensive to provide, and that elevated temperatures could be simulated by heating sensors within the system. In this way, the various valves and other temperature dependent components operate at the same elevated set points as in the actual system (i.e., 450° F. and 490° F.), but the simulated bleed air passing through the ducts and valves is unheated and thus is generally at temperatures of 120° F. or less (depending upon ambient temperatures). As a result, the operator and students can touch most of the components and make contact with the simulated bleed air without burning themselves.

Under operating conditions in an actual aircraft, bleed air temperatures may be above 400° F. for extended periods of time. Duplicating such air temperatures in the training aid is difficult, would require additional safety measures for personnel and increases the energy costs and time required for simulation.

Figure 9A:
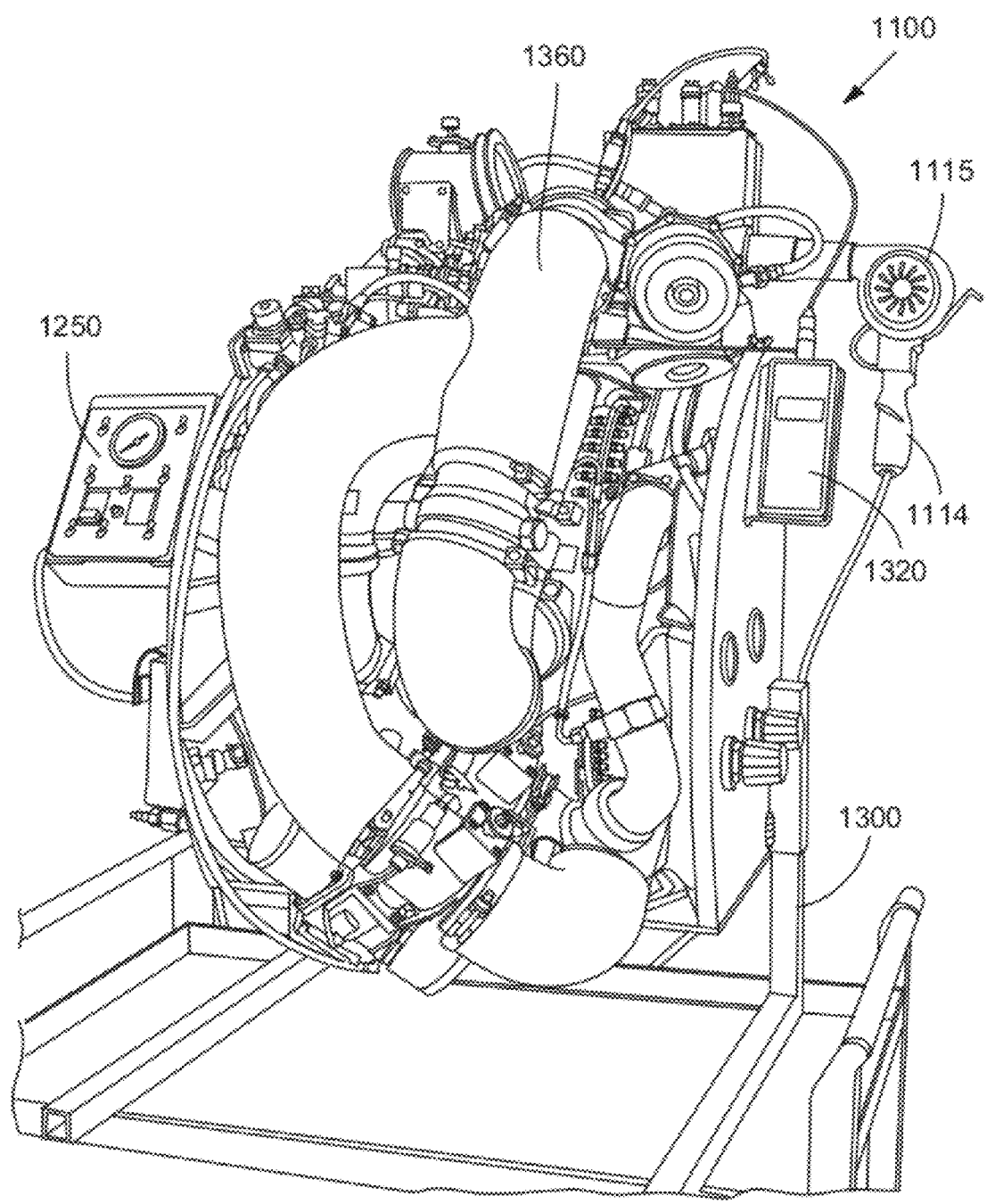
FIGS. 9A and 9B are perspective views of portions of the training aid constructed according to the second example.

In the illustrated implementations, a heat gun 1114 or other source of heat is used to heat one or more sensors to predetermined temperatures. For example, a 490° F. over temperature switch 1218 can be positioned, e.g., in a compartment 1119, for heating by the heat gun 1114. Referring to FIG. 9A, the heat gun 1114 may have an adjustable vane 1115 that allows the adjustment of the air flow rate from the nozzle. The heat gun 1114 may also have a "fan only" setting that allows the heat gun to move air without heating it. Similarly, a 390° F. precooler control valve sensor and a 450° F. thermostat 1222 are also positioned in the compartment for heating by the heat gun 1114.

There is a reverse flow valve 1112 that allows a portion of the system to be reversed to simulate other conditions. There is an air exit valve 1117 that is manually actuatable to allow pressurized air in the system to exit through an air exit 1116. A pneumatic test kit connection 1273 allows a pneumatic test kit to be connected to the training aid.

Figure 6A:
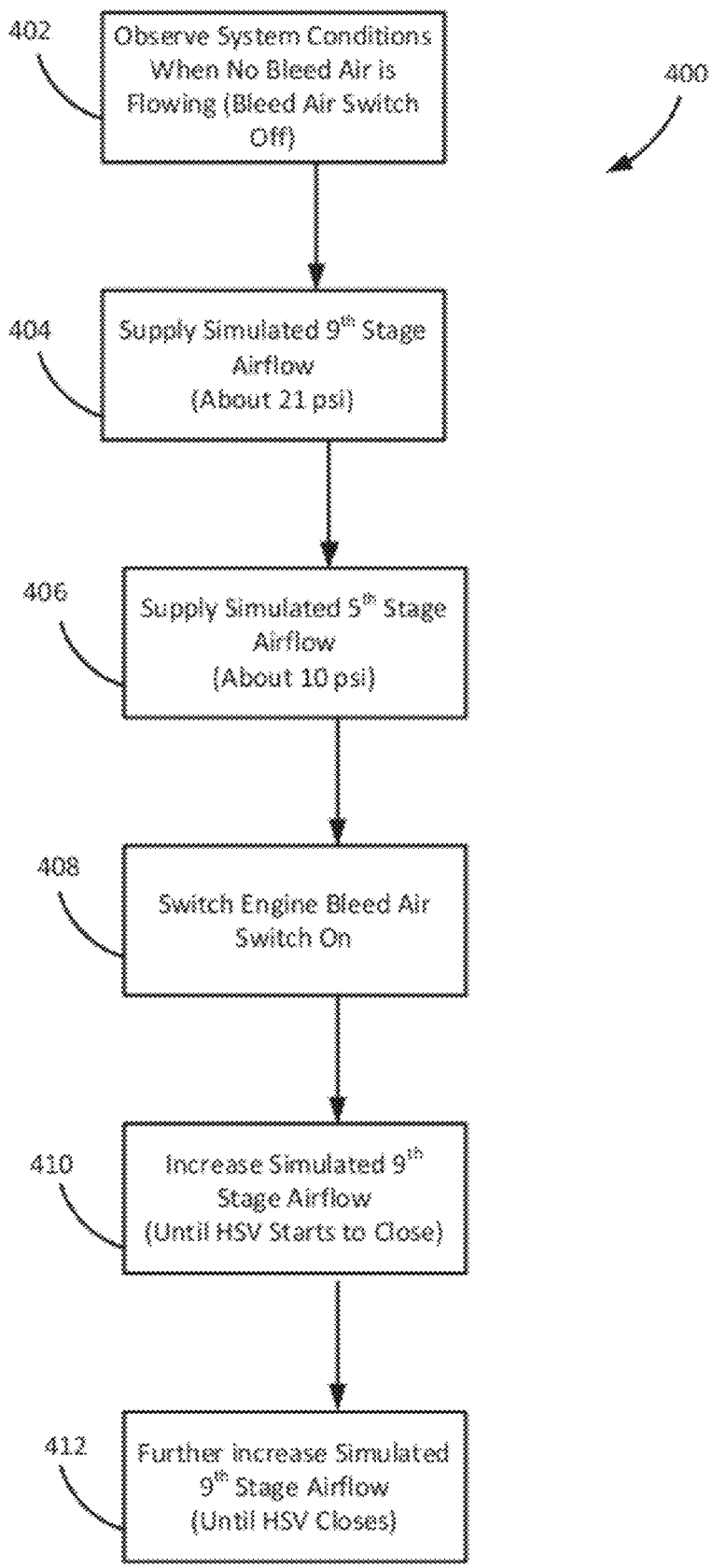
FIGS. 6A, 6B and 6C are flowcharts showing one illustrative sequence of simulated conditions that can be demonstrated using the training aid of FIG. 5.
Figure 6B:
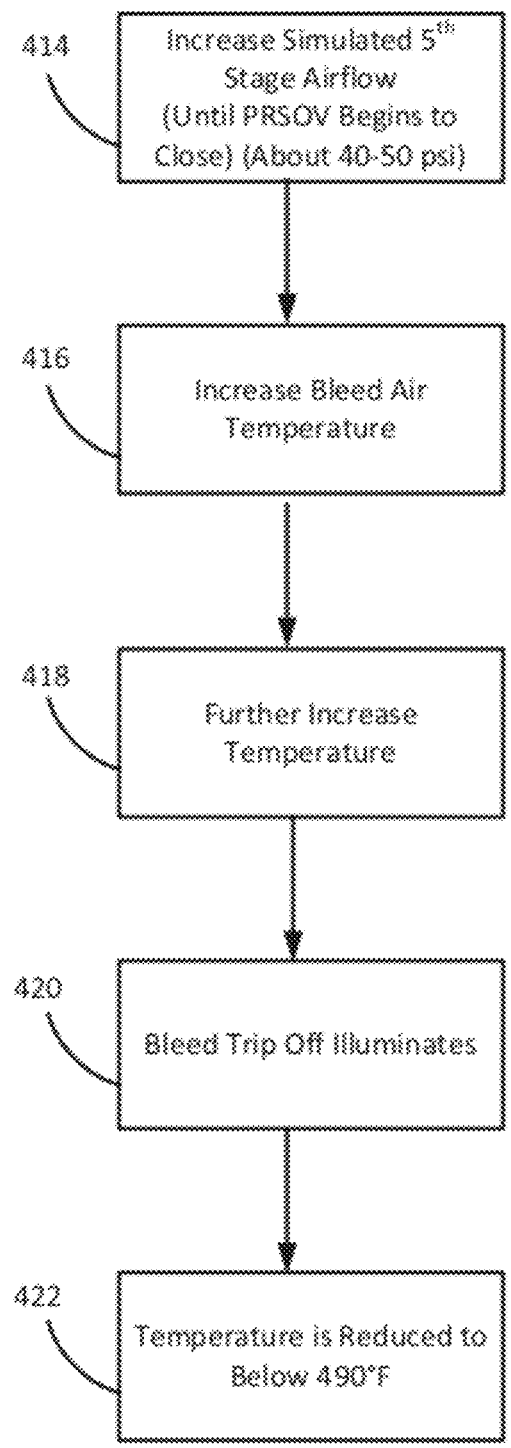
Figure 6C:
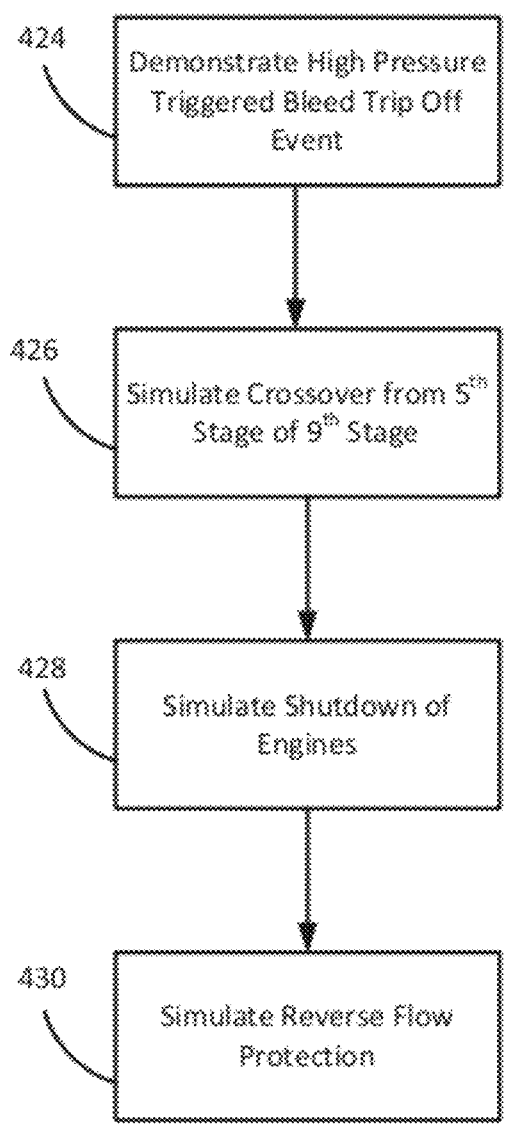

In use, the training aid 1100 can be used to teach how aspects of an aircraft pneumatic system operate under different conditions, with a further goal of helping students gain insights into diagnosing problems in the system and repairing them. The method 400 shown in FIGS. 6A-6C is a presentation involving the training aid 1100 in which an instructor can simulate many important conditions of an engine air bleed system for an aircraft. Although the steps of the method 400 are presented in an order that follows a typical sequence that might be observed in a flight, it is of course possible to present single steps individually, or present a different number of steps in a different order.

In step 402, the training aid 1100 is configured to show the system when no bleed air is flowing, i.e., the bleed air switch 1252 is off, such as, e.g., when the engines are not operating. The regulators 1196 and 1198 that control the flow of simulated bleed air are off. The high stage valve 1206 is closed. The precooler control valve 1212 is open.

In step 404, a supply of simulated ninth stage bleed air is initiated. The instructor, or a student under the instructor's direction, opens the regulator 1196 to start a flow of simulated ninth stage bleed air until a duct pressure of about 21 psi is shown on the gauge 1280. As the pressure increases beyond 5-10 psi, the high stage valve 1206 can be observed moving to the open position. The precooler control valve 1212 moves to the closed position.

In step 406, the regulator 1198 for simulated fifth stage bleed air is opened to supply about 10 psi as shown on the gauge 1281. The PRSOV 1208 remains closed, however, so the duct pressure on the gauge 1280 (FIG. 4B) is about 0 psi. This step simulates the conditions when the engine is starting and being operated at normal idle while on the ground (21% N1) with the bleed air switch off.

In step 408, it is verified that the regulator 1196 is supplying simulated ninth stage bleed air at about 21 psi, and that the regulator 1198 is supplying simulated fifth stage bleed air at about 10 psi. The engine bleed air switch 1252 is then turned on, simulating the conditions of the engine operating at normal ground idle. The PRSOV 1208 moves to the open position, thus supplying airflow to the duct. The gauge 1280 should read about 18 psi. This step simulates the conditions of normal idle while on the ground with the bleed air switch on.

In step 410, the conditions of advancing throttle, e.g., to about <30% N1, are simulated. Under increased air flow, the pressure in the duct is regulated to a predetermined threshold. For example, as the regulator 1196 is opened to allow the simulated ninth stage bleed air supply to increase to about 35-40 psi, the high stage valve 1206 starts to close, closing fully when the pressure exceeds about 34 psi.

In step 412, the conditions of further advancing throttle, e.g., to about <47% N1, are simulated to show the cross over from bleed air being supplied by the ninth stage to bleed air being supplied by the fifth stage. Once the high stage valve closes at about 34 psi, then the simulated fifth stage bleed air becomes the source.

In step 414, the simulated fifth stage airflow is further increased until the supply pressure is about 40-50 psi. As necessary, the air exit valve 116 can be actuated to reduce the duct pressure as shown on the gauge 1280 to about 42 psi. At about 42 psi, the PRSOV will begin to close to regulate the pressure in the duct. This step simulates the conditions of further advancing the throttle, e.g., to about <56% N1, with the bleed air switch on.

In step 416, the conditions of bleed air temperatures above 390° F. are simulated. The heat gun 1114 is turned on to a "hot" setting and the louver 1115 is closed. The heated air from the heat gun is directed at the compartment 1119 within which the 390° F. precooler control valve sensor 1220 is positioned. The temperature shown on a thermocouple and digital readout 1320 can be provided to sense the temperature of the simulated engine bleed air flow is also observed to be increasing. As the temperature reaches 390° F., the precooler control valve 1212 opens. This step simulates that in the actual system, cooler air from the precooler would be admitted to mix with the high temperature bleed air in the duct and therefore lower the temperature of air in the duct.

In step 418, the bleed air temperatures are further increased. The heat gun 1114 is used to heat the compartment 1119 to between 440° F. and 488° F. The PRSOV 1208 will move to the closed position. It can be observed that air will escape from the top of the 450° F. thermostat 1222. The instructor can actuate the air exit valve 1117 to maintain approximately 0-5 psi as shown on the gauge 1280.

In step 420, a bleed trip off event caused by high temperature is simulated. As the temperature continues to increase and to reach 490° F., the 490° F. overtemperature switch 1218 closes and the Bleed Trip Off lamp 1256 is illuminated. The PRSOV 1208 closes, and the pressure in the duct drops to zero. If a reset is attempted (i.e., by depressing the Reset button 1278), the Bleed Trip Off light will remain illuminated and will not be reset because the temperature is still above the 490° F. threshold.

In step 422, the conditions following the cooling of the bleed air are simulated. The heat gun 1114 is switched to the "cold" setting and the inlet louver 1115 is opened to allow ambient air to be conveyed into the compartment. When the temperature decreases below 490° F., pressing the Reset button will trigger the PRSOV 1208 to open, and the pressure in the duct will increase. The Bleed Trip Off light 1256 will be extinguished.

In step 424, a bleed trip off event due to a high pressure condition is demonstrated. In preparation, the simulated fifth stage bleed air is set to be supplied at 40-50 psi. The PRSOV 1208 should be at least partially open. If necessary, the air exit valve 1117 is actuated to obtain a duct pressure of about 42 psi on the gauge 1280. An Overpressure Simulation Control 1308 (FIG. 7) is activated, e.g., by the instructor or a student under the instructor's direction pushing and holding a button. This control simulates a pressure of more than 220 psi in the duct. Thereafter, the Bleed Trip Off lamp 1256 is illuminated, the PRSOV 1208 closes and the pressure in the duct drops to zero. The Bleed Trip Off lamp remains lit until a successful reset is completed, at which time the 220 psi overpressure switch is opened, the PRSOV 1208 is opened and the duct pressure begins to increase.

In step 426, the crossover from fifth stage bleed air to ninth stage bleed air is simulated. When the throttle is retarded from a high level (e.g., >56% N1) to a medium level, the source of bleed air switches over from the fifth stage at the level to the ninth stage at the medium level.

In step 428, the conditions of shutting down the engines are simulated. The engine bleed switch 1252 is turned off. The PRSOV 1208 moves to the fully closed position. The regulators 1196 and 1198 are turned off. The duct pressure falls to zero. The precooler control valve 1212 moves to the open position.

In step 430, the conditions of operating the system with the APU 150 are simulated. By manipulating the regulator 1196, simulated ninth stage bleed air is supplied at about 21 psi. Similarly, the regulator 1198 is manipulated to supply simulated fifth stage bleed air at about 10 psi. The air conditioning packs are on, and the Bleed Air switch 1252 is on. If the APU switch 1274 is turned on, then pressure generated by the APU 150 higher than the current pressure in the duct is generated. The higher pressure air from the APU 150 will cause the high stage regulator reverse flow check valve to operate, which bleeds the flow $P_c$ leading to the high stage valve 1206, thereby causing the high stage valve 1206 to close. This is simulated by turning the reverse flow valve 1112 on.

The training aid 1100 also serves as an excellent subject on which to train personnel in the use of a pneumatic system test kit. Such a test kit is used by maintenance personnel for diagnosis of problems in the pneumatic system. The test kit comprises (1) a connection to a source of pressurized gas (e.g., bottled nitrogen), (2) a control pressure gauge, (3) two needle valves, (4) a supply pressure gauge and (5) a connection to a component's supply side. In some applications, an electrical test box having visual indicators is used to receive and display an indication from the component, e.g., to cause a light to be illuminated to indicate normal operation. Through use of the training aid, the function and use of the test kit can be taught without requiring a working jet aircraft to be taken out of service.

Figure 7:
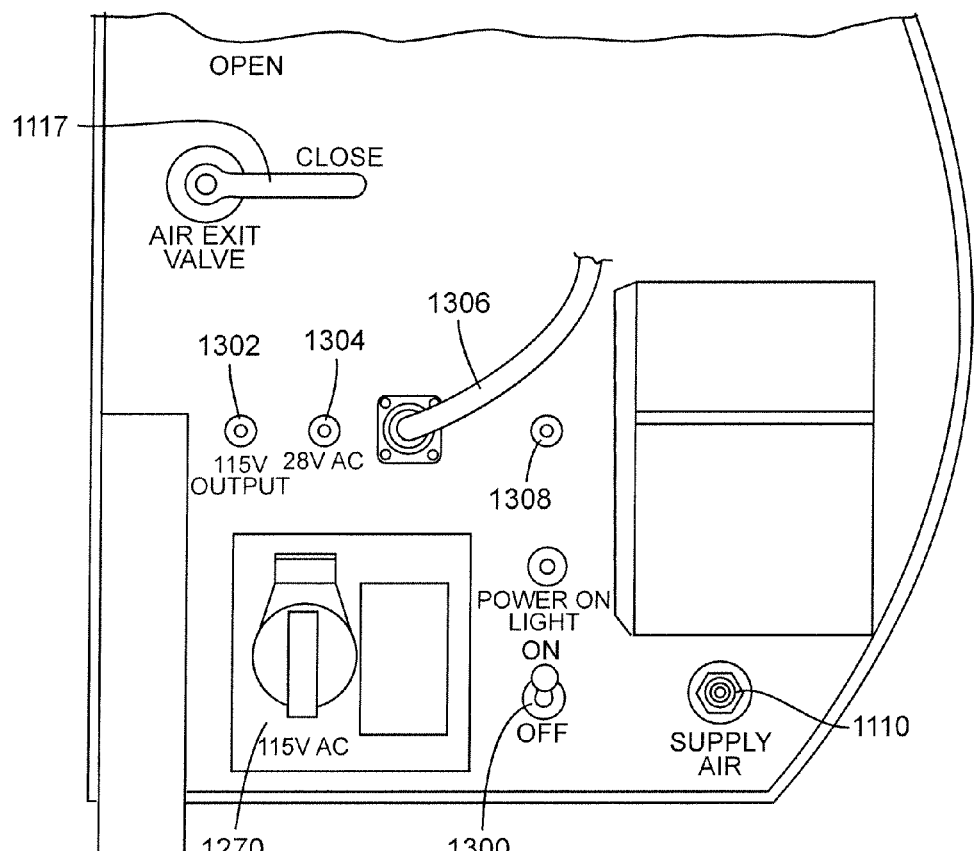
FIG. 7 is an elevation view of connections and controls area for the training aid of FIG. 5.

As shown in FIG. 7, the training aid 1100 has a power switch 1300, the air source or supply connection 1110, 20 amp and 3 amp circuit breakers 1302, 1304 and the connection to 115V power 1270, which can be conveniently mounted as shown on a side of the training aid. Also shown is a cable connection 1306 for connection to the panel 1258. The air exit valve 1117 is also conveniently mounted at the same side of the training aid. The overpressure simulation switch 1308 can be pushed and held to simulate overpressure conditions.

Figure 11A:
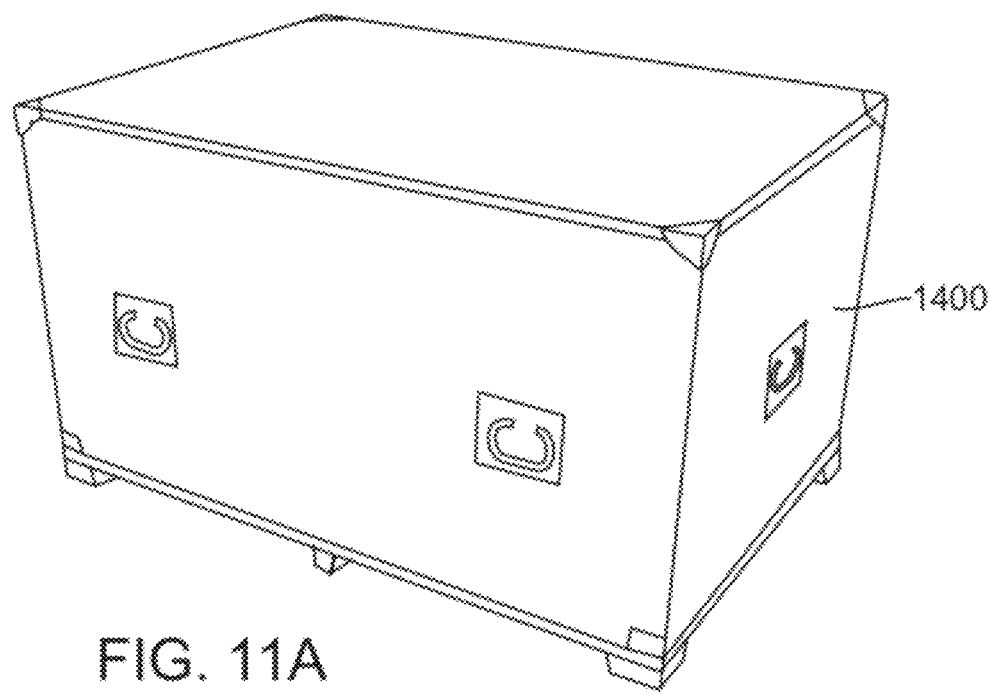
FIGS. 11A and 11B Are perspective views of a shipping container and the training aid as packed for shipment, respectively.
Figure 11B:
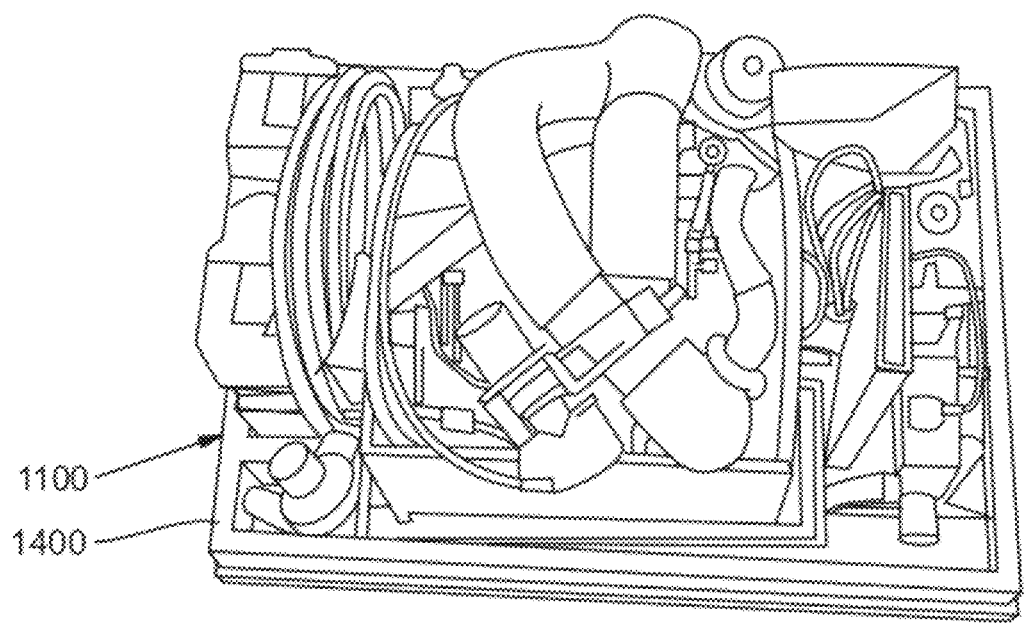

Conveniently, the training aid 1100 can be disassembled, packed in a shipping crate 1400 as shown in FIGS. 11A and 11B, and shipped worldwide by air on a conventional 737. In one implementation, the shipped weight of the training aid, including the shipping container, is about 300 pounds.

The duct can be configured in several different ways. At least a portion of an actual duct can be used to give students a realistic training environment. Alternatively, a simulated duct 1360, such as is shown in FIG. 9A, can be used. According to the approach taken in the training aid 1100, simulated pressures, which are lower than actual pressures, are used for convenience and safety. Thus, the ducts in the training aid 1100 need not be constructed to withstand high pressures. In some implementations, at least a portion of the air ducts are formed from commonly available clothes dryer ducting material.

Figure 10A:
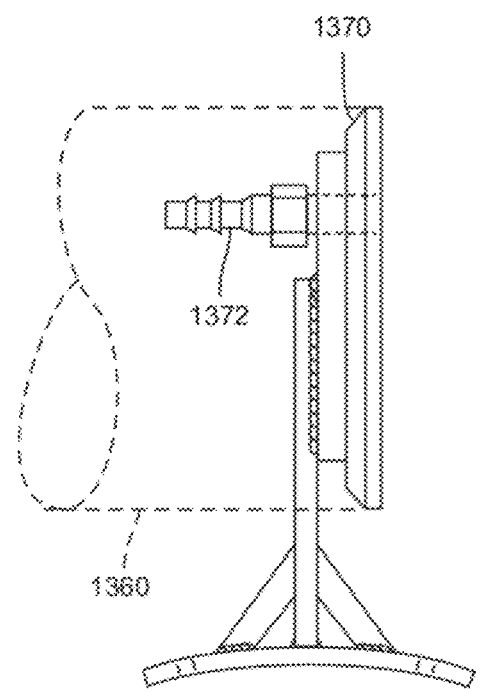
FIGS. 10A and 10B are side and front views, respectively, of a backing plate used to support a small diameter fluid line within a large diameter duct.
Figure 10B:
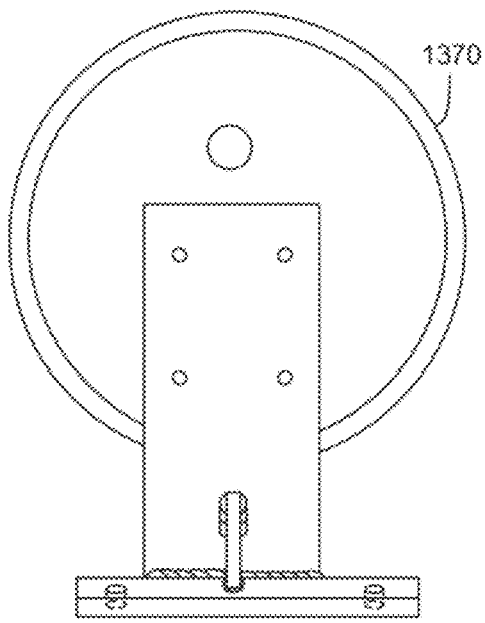

In one implementation, the simulated duct 1360 is configured for cosmetic purposes to have a large outside diameter as shown in FIG. 9A similar in size to the actual duct. The pressurized fluid (generally, air or nitrogen) that follows the path of the duct does not contact the duct, but rather is conveyed within a small-diameter (e.g., 0.25 inch diameter) flexible fluid line with standard fittings hidden within the duct as shown in FIG. 10A. In this way, secure fluid connections can be made quickly and easily to allow for the training aid to be readily assembled and disassembled. Also, less volume of pressurized fluid is required. FIG. 10A also shows a backing plate 1370 that supports a small-diameter fluid line 1372 within the duct 1360. The backing plate can also serve as a bracket to support the duct and various other components.

Figure 8:
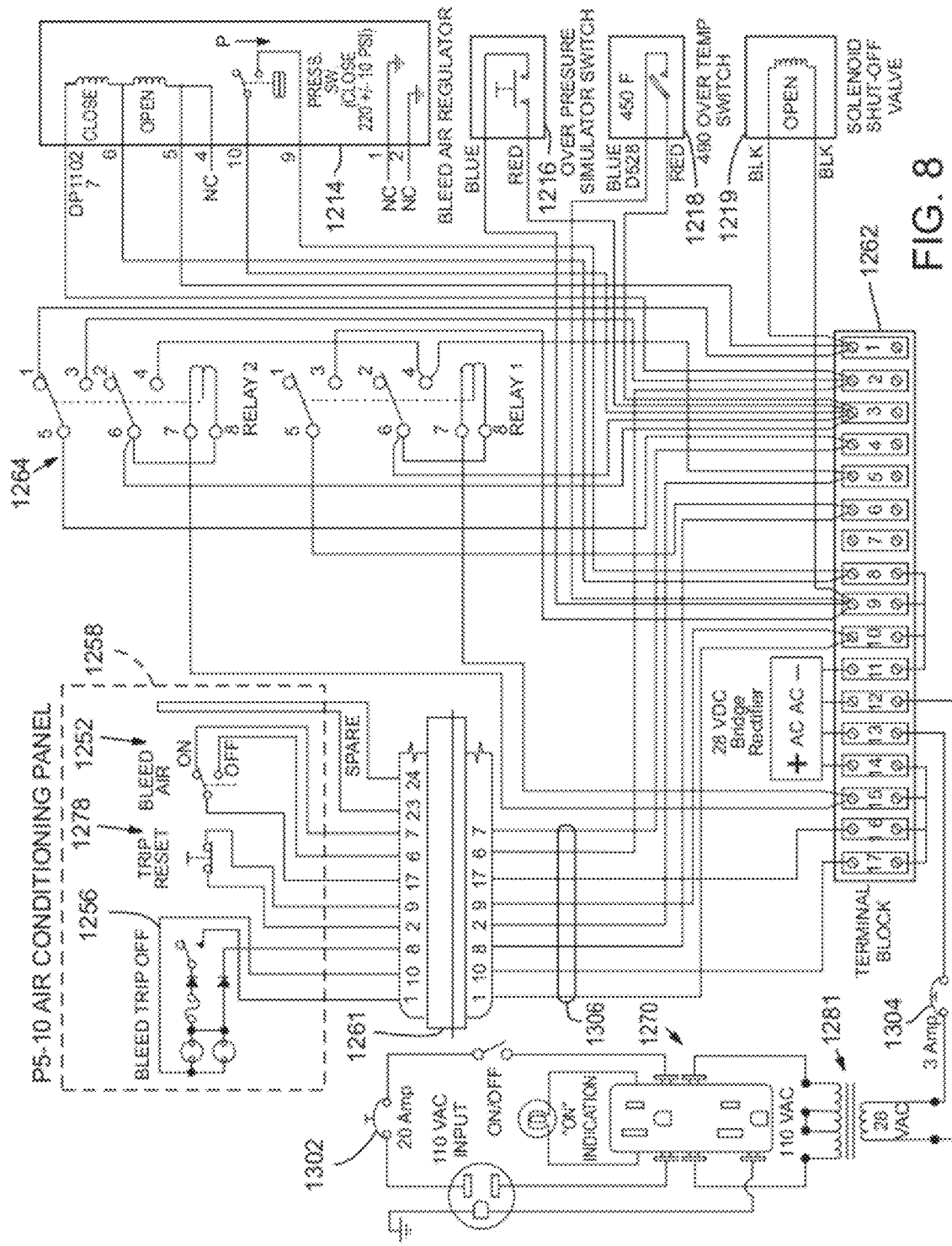
FIG. 8 is a wiring diagram for the vehicle pneumatic system training aid of the second example.

FIG. 8 is a diagram illustrating some of the electrical elements of the system 1100 and their interconnections. There is a panel 1258, similar to the panel 158 of FIG. 3, that emulates the pilot's controls and indicators. Thus, there is a bleed trip off indicator light 1256 that is controlled to be illuminated when it desired to simulate a bleed trip off event. A bleed air switch 1252, which allows for the supply of bleed air when in the "ON" position, is also present in the panel 1258. A trip reset switch 1278 that can be actuated following a bleed air trip event in an effort to rest the system, is also present in the panel 1258.

As shown in FIG. 8, the panel is conveniently interconnected through one or more terminal blocks 1261, 1262 to relays 1264, to the bleed air regulator 1214, to the simulated overpressure switch 1216, to the 490° F. over temperature switch 1218 and to a solenoid shutoff valve 1219.

The connection 1270 to a source of electrical power, such as conventional 110 V AC power is also shown in FIG. 8. The 110 V input is stepped down to 28 V at the transformer 1281, which is then fed to the terminal block 1262.

Figure 9B:
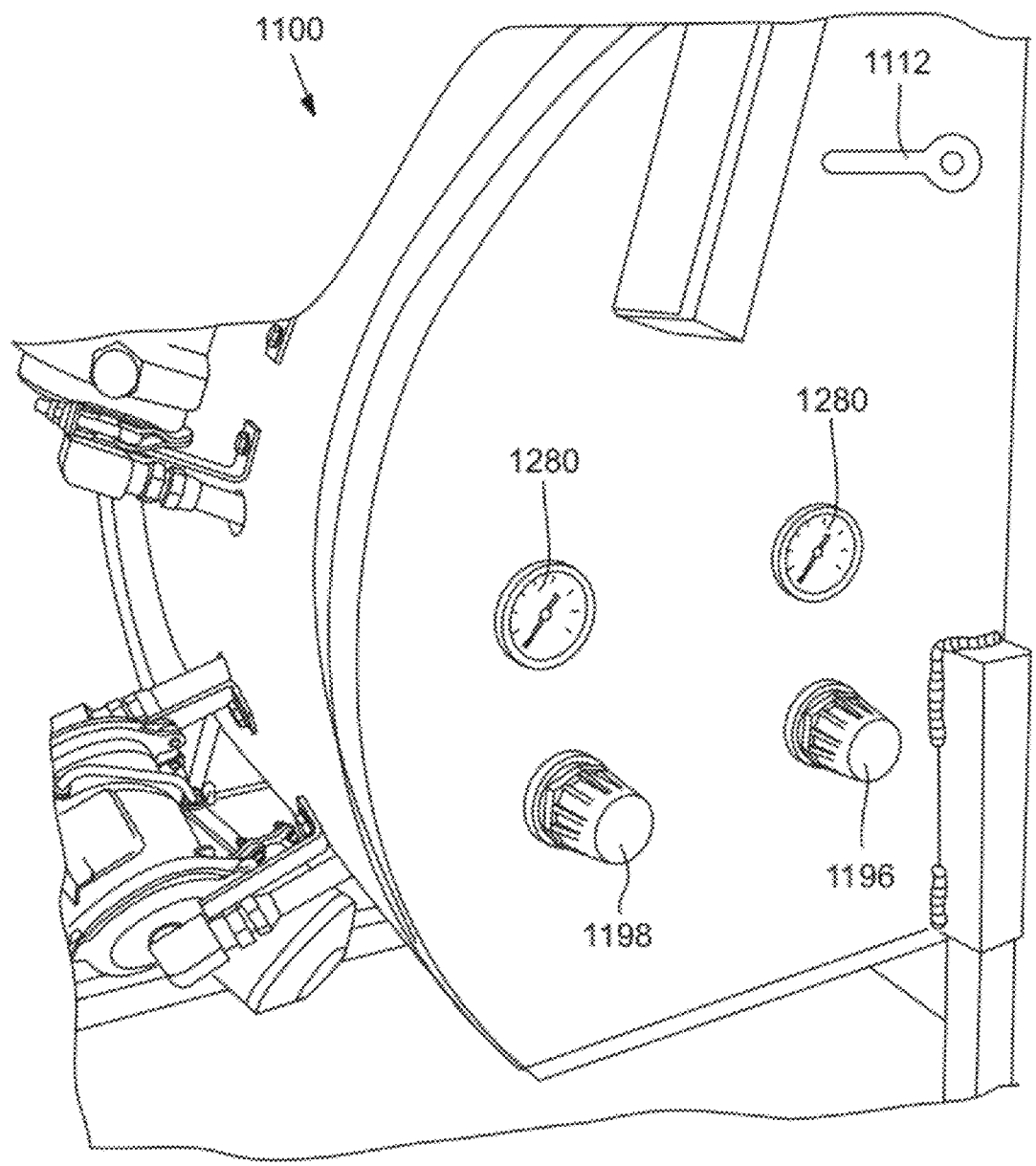

FIGS. 9A and 9B are perspective views of the training aid 1100 of the second example. The training aid 1100 has a frame 1300 that supports the various components shown in FIG. 5 in realistic positions and in a generally upright fashion. As described, the panel 1250 is positioned within view of the fluid control devices, e.g., the various valves, and their fluid flow and control and sensing connections. The training aid 1100 may be wheeled or otherwise configured to allow for easy transport. The thermocouple and digital readout 1320 serves as a check on the other instruments and allows an instructor to present additional temperature information during teaching scenarios. The instructor may be provided with special controls over the system to allow for an accurate and captivating presentation to a group of students.

The training aid allows maintenance personnel and others to gain a thorough understanding of the pneumatic system. In the illustrated examples, the training aid's focus is the components relating to bleed air and how they interrelate, such as in a bleed air trip event. The same principles could be used, however, to model other pneumatic system scenarios. As a result of the training aid, maintenance personnel and others have a more thorough understanding of the pneumatic system. They are able to diagnose problems more quickly and accurately. They make more effective use testing equipment, including the pneumatic test kit and other diagnostic devices. They tend to replace the highly specialized and very expensive components of the pneumatic system more judiciously. They can be shown how to reconfigure the components for disassembly and/or maintenance.

In exemplary embodiments, the training aid provides opportunities for hands on training. In some embodiments, one or more of the components are actual components, or at least have a similar size, appearance and/or function as actual components, of the system being simulated. With the training aid, training can be provided without using an aircraft, which makes scheduling the time and place for training much more flexible.

The training aid is portable and may be configured with wheels to allow it to be rolled around for repositioning as necessary. Because the required electrical power and shop air (or bottled gas) supplies are readily available, the training aid is convenient and straightforward to set up and use. In addition, the training aid is designed for disassembly to allow for shipping or transport in a compact crate.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. A method of simulating operation of an aircraft engine bleed air system, comprising: providing a portable, freestanding, engine bleed air system training aid operable in a classroom environment;

providing simulated controls and indicators corresponding to a selected subset of an aircraft pilot's engine bleed air controls and indicators located in the aircraft cockpit;

providing an engine bleed air training circuit comprising at least two simulated engine bleed air components corresponding to two respective actual engine bleed air components of the aircraft engine bleed air system that are hidden from view during aircraft operation and positioned distant from the aircraft cockpit, wherein a first of the at least two simulated engine bleed air components comprises a simulated high stage valve;

arranging the engine bleed air training circuit on the engine bleed air system training aid with the at least two simulated engine bleed air components in view of a trainee addressing the engine bleed air system training aid;

arranging the simulated controls and indicators within reach of a trainee addressing the engine bleed air system training aid and within view of the at least two simulated engine bleed air components;

providing a container of pressurized gas on the engine bleed air training aid; providing an interactive training visualization comprising the engine bleed air training circuit, the simulated engine bleed air components and the simulated controls and indicators simultaneously visible to and operable by the trainee;

simulating high temperature and high pressure operation of the aircraft engine bleed air system by flowing gas from the container of pressurized gas at low temperature and low pressure through the simulated engine bleed air components;

heating the low temperature gas to a higher safe training temperature, the higher safe training temperature being below actual high operating temperature;

sensing temperature within the engine bleed air training circuit and determining when the higher safe training temperature is reached;

causing at least one of the simulated engine bleed air components to visibly change condition when the higher safe training temperature is reached;

displaying an indication of the simulated engine bleed air component's changed condition on the simulated controls and indicators;

providing a reverse flow control in the simulated engine bleed air circuit, the reverse flow control being operable to cause flow in the simulated engine bleed air circuit to change between a conventional flow direction corresponding to a flow direction in the aircraft engine bleed air circuit to a reverse flow direction not corresponding to any actual flow condition in the aircraft engine bleed air circuit;

actuating the reverse flow control to change from the conventional direction to the reverse flow direction, thereby simulating increasing pressure in the simulated engine bleed air circuit;

causing the simulated high stage valve to close automatically in response to the reverse flow;

receiving a manual input from the trainee to address the simulated engine bleed air component's changed condition; and within the interactive training visualization, causing the simulated controls and indicators to display an indication responsive to the manual input.

2. The method of claim 1, further comprising the acts of:

providing a test kit separate from the engine bleed air system training aid, the test kit comprising a source of pressurized gas, a control pressure gauge, two needle valves, a supply pressure gauge and a connection to a supply side of one of the simulated engine bleed air components;

simulating an operating condition of the aircraft engine bleed air system with the engine bleed air training aid;

displaying an indication of the simulated operating condition on the simulated controls and indicators;

determining that at least one of the simulated engine bleed air components is possibly malfunctioning;

connecting the connection of the test kit to the possibly malfunctioning simulated engine bleed air component;

using the source of pressurized gas and control pressure gauge to supply gas at a known pressure through the connection;

measuring a pressure of the pressurized gas at the possibly malfunctioning simulated engine bleed air component with the supply pressure gauge; and evaluating the measured pressure to determine if the possibly malfunctioning simulated engine bleed air component is malfunctioning.

3. The method of claim 1, further comprising the acts of:

providing simulated large diameter duct sections physically connected to the simulated engine bleed air components; and concealing a small diameter fluid line within the simulated duct sections, the small diameter fluid line having connections to at least the container of pressurized gas, the simulated engine bleed air components and a control for supplying the pressurized gas through the small diameter line, wherein the simulated engine bleed air circuit is configured such that the simulated components sized for supply of pressurized air through the large diameter duct sections are operable with pressurized gas supplied through the small diameter line.

4. The method of claim 1, further comprising the acts of:

providing at least one instructor control to supplement operation of the simulated controls and indicators operable by the trainee, wherein the instructor control is positioned outside of the interactive training visualization and is actuatable to trigger a change in an operating condition of the simulated engine bleed air circuit for instructing the trainee.

5. The method of claim 1, further comprising the acts of:

providing an overpressure simulation control;

actuating the overpressure simulation control to simulate an overpressure condition in the aircraft engine bleed air system within the engine bleed air training aid.

* * * * *

UNITED STATES PATENT AND TRADEMARK OFFICE
CERTIFICATE OF CORRECTION

PATENT NO. : 8,794,969 B2  
APPLICATION NO. : 13/223181  
DATED : August 5, 2014  
INVENTOR(S) : Philip M. Tenning et al.

Page 1 of 1

It is certified that error appears in the above-identified patent and that said Letters Patent is hereby corrected as shown below:

In the Claims:

Column 12, line 52,

"bleed air training aid; providing an" should read

–bleed air training aid;

providing an–.

Signed and Sealed this  
First Day of March, 2016

Michelle K. Lee  
*Director of the United States Patent and Trademark Office*